Oct. 13, 1959 T. T. TRUE 2,908,877
CRYSTAL FILTER
Filed Feb. 14, 1955
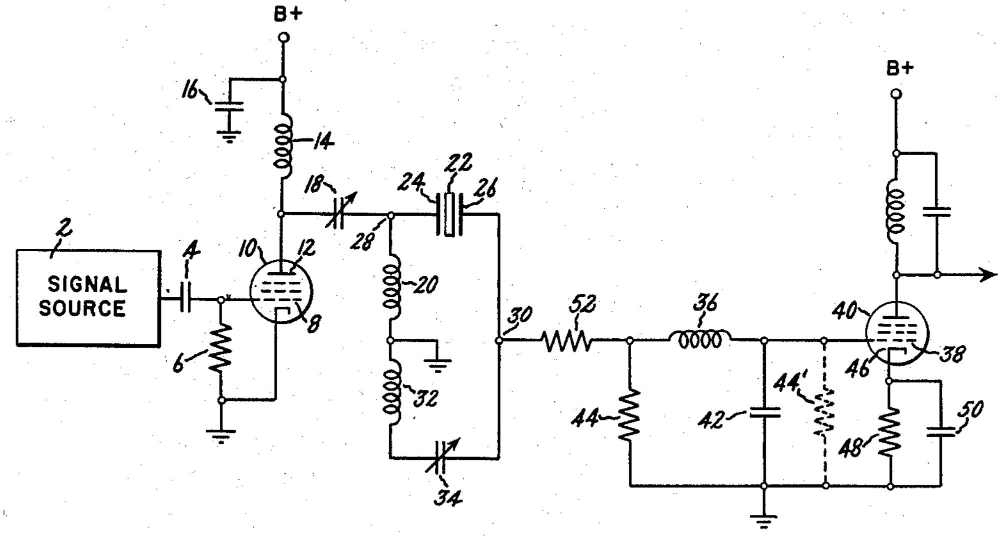
INVENTOR:
THOMAS T. TRUE,
BY Donald N. Timbie
HIS ATTORNEY.

United States Patent Office 2,908,877

Patented Oct. 13, 1959

2,908,877

CRYSTAL FILTER

Thomas T. True, North Syracuse, N.Y., assignor to General Electric Company, a corporation of New York Application February 14, 1955, Serial No. 488,032

2 Claims. (Cl. 333—72)

This invention relates to a crystal filter and in particular to a crystal filter having a Q that varies in accordance with the strength of the signal applied to the filter.

This invention has been found to be particularly advantageous when used to perform certain functions in a color television receiver constructed so as to reproduce images from signals such as provided in the present N.T.S.C. standardized color television system. In this system, the video signal includes a brightness signal, similar to the brightness signal transmitted in black-and-white television, a color carrier located at the upper end of the video spectrum, the usual line and field synchronizing signals and bursts of a predetermined phase of the color carrier frequency following certain of the line synchronizing pulses. In this system the phase of the color carrier is varied in accordance with hue and its amplitude is varied in accordance with the purity of a color or its degree of saturation. At the color receiver, the bursts of color carrier frequency are converted into a continuous wave of the same frequency and having a predetermined phase relationship to the cycles of the color carrier contained within the bursts. This continuous wave is known as a reference wave and is heterodyned in various ways with the color carrier so as to recover certain components of the color information.

It has been found advantageous to employ crystal filters for deriving the reference wave. Various crystal filters suitable for this purpose may be found in my copending applications bearing Serial Number 488,059, filed on February 14, 1955, Serial Number 488,031, filed on February 14, 1955, now abandoned, Serial Number 489,120, filed on February 18, 1955.

In these other applications, means are provided for driving one side of a crystal and a suitable terminating network is coupled to the other. The terminating network for the crystal generally includes a series-resonant circuit comprised of an inductance and a capacitor and the voltage appearing across the capacitor is coupled to the grid of an amplifier.

The design considerations for using crystal filters of this type in a color television receiver of the type briefly described above, are as follows: The amount of phase shift with color-carrier frequency change and crystal temperature drift limits the maximum tolerable Q of the filter to approximately 8000. The reason for this is that the change in phase of the reference wave for a given change in frequency of the cycles in the burst at the input of the filter increases with the Q of the filter. As part of the information contained in the color carrier resides in its phase, variations in the phase of the reference wave, which is used to measure the phase shift in the color carrier, must be held to a minimum.

However, when extremely weak signals are received, it is desirable in order to produce a reference wave free of the effects of noise which appears along with the burst, to operate the crystal filter at a higher Q, for example, from 16,000 to 30,000, i.e., from two to four times the Q for strong signal operation. Whereas this increase in the Q of the filter causes an increased amount in phase shift of the reference wave for variations in the frequency of the cycles in the bursts, the errors in the hue produced by such shifts in phase of the reference wave are more tolerable because in an image reproduced from weak signals, the errors in hue are not as visible. Under such conditions, the operator would be more willing to adjust his manual hue control so as to secure proper color rendition. This condition would be preferable to one wherein a reference wave produced would be so distorted by noise that proper color reproduction becomes impossible.

Accordingly, it is an object of the present invention to provide a crystal filter having a Q that is varied in accordance with the strength of the signals applied to the filter.

It is another object of this invention to provide a variable Q crystal filter that requires no extra components and, therefore, is less expensive to manufacture.

Briefly, the objectives noted above may be attained in accordance with the principles of this invention as follows: The filter includes a driving circuit for applying the bursts to one side of the crystal and a terminating circuit connected to the other side of the crystal. The voltage appearing across a portion of the terminating circuit is applied to the grid of an amplifier. The bias on this amplifier is adjusted so that grid current is drawn at strong signal levels, but grid current is not drawn at extremely low signal levels, i.e., levels which are normally encountered under weak signal conditions. The nature of the terminating circuit and the manner of coupling it to the grid of the amplifier is such that the greater the amount of grid current drawn, the greater is the resistance effectively placed in series with the crystal and consequently, the lower is the Q of the crystal filter. Although the circuit for changing the Q is shown in combination with a particular crystal filter, it will be understood that this circuit can be applied to other crystal filters. However, the particular crystal filter circuit shown has characteristics which make it work more effectively in combination with a circuit of this invention.

The manner in which the above objectives, as well as other objects and advantages of this invention, are obtained, will be more clearly understood after the following discussion of the drawings.

It will be observed that the driving circuit for the crystal is similar to the driving circuit shown in my copending application bearing Serial Number 489,120 and filed on February 18, 1955. However, in order that the circuit may be completely understood, a complete description of the overall operation is given. A source of signals, to be applied to the crystal filter, is indicated by the numeral 2 and it is to be understood that the signals provided by this source may be in the form of bursts. A source 2 is coupled via a condenser 4 and a grid-leak resistor 6 to a control grid 8 of an amplifier 10. The plate 12 of the amplifier 10 is connected to one end of an inductance 14 which may be variable. The other end of the inductance 14 is connected to B+ and as usual, the source of B+ is bypassed for signal frequencies by a condenser 16. A series-circuit comprised of a condenser 18, which may be variable, and an inductance 20 is connected between ground and the plate 12. A crystal 22, contained within the usual holders 24 and 26, is connected between the junction 28 of the condenser 18 and the inductance 20 and a terminal 30. Neutralization of the capacitance of the holders 24 and 26 is effected by connecting a coil 32 and a variable condenser 34 in series between ground and the terminal 30. The inductances 20 and 32 have unity coupling and this may be attained by making them bifilar windings. It is apparent that the voltages appearing at the ungrounded ends of the inductances 20 and 32 are out-of-phase and that if the condenser 34 is adjusted so as to have the same capacitance as the effective capacitance of the holders 24 and 26, any energies or voltages shunted around the crystal 22 by the capacitance of the holders 24 and 26 will be neutralized at the terminal 30. In most applications, the value of the inductance 14 is large with respect to the value of the inductance 20. Therefore, variations of the amount of capacitance of the condenser 18 can be effected so as to make inductance 14 have parallel resonance for signal frequencies. This can also be accomplished by varying inductance 14. The ratio between the reactance of the condenser 18 for signal frequencies and the reactance of the inductance 20 for these same frequencies provides an impedance match between the input of the crystal 22 and the source including the amplifier 10.

The terminating network for the crystal 22 in this particular embodiment of the invention is comprised of a resistor 52 and an inductance 36 connected in series between the terminal 30 and a control grid 38 of an amplifier 40. A condenser 42 is connected between the grid 38 and ground and a grid-leak resistor 44 is shown as being connected between ground and a point between the resistor 52 and the inductance 36. It would be possible to connect the resistor 44 directly to the grid 38. This alternate connection is illustrated by the dotted resistor 44'. A cathode 46 of the amplifier 40 is connected to ground via a biasing resistor 48 and a bypass condenser 50.

It will be understood that the form of the amplifier 40 is not significant. Any electron discharge device or valve having two electrodes or members between which current flows in proportion to the applied signal will suffice.

The operation of this crystal filter is as follows: Although a particular driving circuit including the condenser 18 and the inductance 20 is shown and described, it will be understood that other driving circuits might be employed. However, as pointed out in my application bearing Serial No. 489,120, one of the characteristics of this driving circuit is the fact that it presents extremely low resistance to the crystal. In practical cases this resistance can be as low as one hundred ohms or lower. If the Q of the crystal is much higher than the highest Q required for the filter as a whole, the insertion of a resistance in series with the crystal such as the resistor 52 lowers the overall Q of the filter to a desired value. In circuits actually constructed, this resistor has been on the order of five hundred ohms and has been sufficient to lower the overall Q of the filter to 8,000 or less. This is the desired condition for strong signal operation.

The operation of the circuit shown in the drawing, as far as the principles of this invention are concerned, is as follows: It is well understood by those skilled in the art that an equivalent series-circuit can be drawn for a parallel circuit. Hence, a circuit formed by a resistor and a condenser connected in parallel may be represented by a condenser and a resistor connected in series. The greater the resistance of the parallel circuit, the less is the resistance of the equivalent series circuit. It will be observed that the resistance between the grid 38 and the cathode 46 is effectively in parallel with the condenser 42. The equivalent resistance in series with the condenser 42 is negligible when no grid current is drawn. The grid-leak resistor 44 is connected at a low impedance point of the series-resonant circuit formed by the inductance 36 and the capacitance 42 and, therefore, has virtually no effect on the equivalent resistance in series with the crystal unless the tube 40 draws grid current. When the tube draws grid current, the resistor 44 determines the average D.-C. current from grid to ground and hence determines the effective load which the grid places across the capacitance 42. As is well known, the crystal can be represented by a resistor, a capacitor and an inductance connected in series. Therefore, the total resistance in series with the crystal 22 is comprised of the resistance of the driving circuit, as seen from the crystal, the internal resistance of the crystal itself, the resistor 52 and the equivalent series resistance of the grid-cathode-path. The overall Q of the filter can be altered by changing any one of these series resistances, actual or equivalent. However, the only one that may conveniently be made to change in accordance with signal amplitude is the resistance between the grid 38 and the cathode 46. The amount of change in the Q of the filter brought about by the change in the resistance between the grid 38 and the cathode 40 is greatest when the other series resistances are at a minimum. For this reason, it is desirable to use a driving circuit that provides a minimum resistance in series with the crystal 22. One such driving circuit is shown and described. It is also desirable that the resistance of the crystal itself be as small as possible. It is essential that the Q of the crystal 22 by itself be higher than any desired Q for the filter, as the filter cannot have a higher Q than the crystal.

Let us assume that the signals applied to such a circuit are so weak as to not draw current at the grid 38. Under this condition, the resistance between the grid 38 and the cathode 42 is so large that its equivalent resistance in series with the crystal 22 is of negligible size. If the combined series resistance of the driving circuit and the crystal 22 is also small, the Q of the filter is primarily determined by the resistance of the resistor 52. If the Q of the crystal by itself is only a little in excess of the Q that the filter as a whole is to have under weak signal conditions, then the resistor 52 might be eliminated as the equivalent series resistance supplied by the driving circuit might be sufficient to reduce the Q of the filter to the desired value. However, it is not always an easy matter to obtain crystals having a precise Q. Therefore, it is easier to obtain a crystal with an extremely high Q and lower the Q of the filter of which it forms a part by inserting a series resistor 52.

In an actual circuit, constructed so as to operate in a color television receiver in accordance with the invention, the Q of the crystal by itself was in the order of 100,000 and the series resistance of the driving circuit and the crystal combined was approximately 100 ohms. The inductance 36 had a value of 45 to 150 μh., the capacitor 42 had a value of 10 μμf., the cathode resistor 48 had a value of 82 ohms, the value of the grid-leak resistor 44 was 15K, and the amplifier 40 was a 6AU6 tube. When the value of the resistor 52 was 100 ohms, the Q of the filter as a whole was in the range of 16,000 to 30,000, as is desired under weak signal conditions. Without the resistor 52, the Q of the filter as a whole would have been too high for satisfactory performance of the color television receiver.

Now assume that the strength of the signals is gradually increased. At some signal level determined by the value of the resistor 48, the grid 38 draws current and from this point on the resistance between the grid 38 and the cathode 46 gradually diminishes, the amount by which it diminishes depending upon the size of the grid-leak resistance 44. In accordance with the principles outlined above, the equivalent series resistance provided by the grid-to-cathode resistance gradually increases and the Q of the filter gradually decreases. In the particular example outlined above, the Q dropped from a range of 16,000 to 30,000 to a value of 8,000 or less.

It will be apparent to those skilled in the art that other values than those noted above and different changes in the Q could be obtained depending on the particular application.

If the grid-leak resistor 44 were eliminated and the grid-leak resistor 44' were connected as shown, the equivalent resistance thus placed in series with the filter and which would thus lower its Q would be larger for both strong and weak signal operation. Hence, it would be possible to eliminate the resistor 52 if the resistor 52 would otherwise be required. In either location, the grid-leak resistor is relatively small compared to the grid-leak resistance normally used in coupling circuits. The reason for this is to insure greater grid current and thus to provide for a satisfactory range of control of the overall Q of the filter.

It will be observed that the grid 38 and the cathode 46 may be considered to correspond to a plate and cathode of a diode. Therefore, it would be possible to operate the tube 40 class A and connect the plate of a diode to the grid of the tube 40 and the cathode of the diode to a source of positive biasing potential.

The following discussion relates to factors which should be considered in selecting crystals for use in the circuit just described under certain operating conditions. If the filter is to be used for producing a continuous reference wave from a series of repetitive bursts of several cycles of the desired reference wave, the following considerations are pertinent. As is well known to those skilled in the art, the bursts may be analyzed into a continuous wave of the reference frequency plus sidebands that are separated by the repetition frequency of the burst. The purpose of the crystal filter is to reduce these sidebands and to pass the continuous wave of the reference frequency. The amount of reduction in the sideband energies required depends upon the circuitry with which the filter is to be used. In general, the more rejection of the sideband energies in the accompanying circuit, the less reduction of these energies is required of the crystal filter.

The amplitude of the sideband energies varies symmetrically about the central frequency of the bursts in the well known $$\frac{\sin x}{x}$$

function. Generally speaking, the amplitude of the sideband energies decreases as the frequency of the sidebands departs from the central frequency of the bursts. As is well known to those skilled in the art, crystals have spurious responses at various frequencies above the frequency of their principal mode of operation. The presence of these spurious responses in the crystal would have little or no effect if they occurred at frequencies other than the frequencies of the sidebands of the bursts. However, in many cases, such as in a color television receiver wherein the burst repetition frequency is 15,750, the sidebands are relatively close together so that it becomes difficult to make crystals on a commercial production basis that have spurious responses occurring between the frequencies at which the sideband energies exist. Furthermore, even if such crystals are available, the spurious responses of the crystal shift in frequency with changes in ambient temperature to such an extent that they may well occur at the same frequency as one of the sidebands.

The effect of the presence of sideband energies at the output of the filter is to produce a reference wave that is amplitude-modulated and phase-modulated at a frequency equal to the difference between the frequencies of the sideband and the central frequency of the bursts. In color television receivers wherein the reference wave provided by the filter is used as a standard with which a phase and amplitude-modulated color carrier is compared in order to derive color signals, phase and amplitude-modulation in the reference wave itself produces errors in the color signals.

In accordance with a preferred embodiment of this invention, the amount of phase or amplitude variation appearing in the reference wave at the output of the filter previously described is reduced below a significant value and the effects of ambient temperature variation are reduced to a nullity. Of greater significance is the fact that it is not necessary to incur the additional expense of carefully selecting crystals having accurately positioned spurious responses. In the preferred embodiment a crystal is used which has negligible spurious response within a large number of cycles of main response frequency. The first spurious response occurs in a region where the sideband energies are extremely small so that if perchance the frequency of the sideband energy and the frequency of the spurious response coincides, only a small amount of sideband energy will appear at the output of the filter. Generally, the frequency at which the first spurious response occurs can be such that any small amount of sideband energy present will be completely rejected by the circuit to which the output of the crystal filter is applied. The exact location of the first spurious response is not critical and may vary to some degree with the particular application. For example, in using this circuit in color television receivers constructed so as to operate within signals transmitted in accordance with present standards, the first spurious response point occurs at about 250 kilocycles above the main response point of the crystal.

At present, crystals having these required characteristics may be produced by bevelling the upper and lower edges of the crystal. In general, the greater the amount of bevelling or "contouring" the less is the amplitude of spurious responses within a given frequency range above the main frequency of the crystal. Eventually, the amplitude of the spurious responses in this range decreases to the vanishing point. However, in general, as the spurious responses within the range decrease, one or more spurious responses outside the range increase in amplitude. In a particular application, the latter spurious responses may be made to occur at such a high frequency as to be severely attenuated by the crystal filter circuitry or to lie outside of the response of the circuit coupled to the filter output.

The effect of contouring is generally the same regardless of the shape of the crystal. However, with rectangular crystals, the necessary amount of bevelling or contouring may not be achieved before the corners of the crystal are so thin as to fracture in normal use. For this reason, it is desirable to use a circular crystal. The technique of contouring is well understood by those skilled in the art and, therefore, requires no further discussion.

The extent to which such contouring should be carried can be more understood from the following analysis. Let $\phi$ represent the phase error that can be tolerated in the reference wave at its point of application. In a color television receiver the point of application would be the synchronous detector which compares the phase of the color carrier with the phase of the reference wave. It should be understood that the maximum phase error that can be tolerated between the color carrier and the reference wave depends on the degree of color distortion that can be tolerated, but in general it seems that it should be not greater than 12 degrees. However, some of the error may be introduced in the transmitter or in parts of the receiver other than the crystal filter itself so that not all of the maximum phase error can be introduced in the crystal filter. At present it seems that the maximum amount of phase error that can be permitted between the input of the crystal filter and the input of the synchronous detector should be about 5 degrees. A constant $A_c$ may indicate the ratio between the output of the crystal filter for an applied signal having a frequency above the frequency of the reference wave and the output of the filter for an applied signal of equal amplitude having the frequency of the reference wave. A constant $A_1$ may represent the same ratio for the circuitry between the output of the crystal filter and the point of application. The ratio between a sideband component of the wave applied to the crystal filter and the central frequency of the wave may be $$\frac{E_n^1}{E_0^1}$$

In general these factors are related as indicated by the following expression, $$\phi = \pm \sin^{-1}\left(\frac{E_n^1}{E_0^1} A_1 A_c\right)$$

For small angles this expression becomes $$\pm \frac{E_n^1}{E_0^1} A_1 A_c$$

In a given application of the crystal filter that is the subject of this invention, $\phi$ may be arbitrarily determined. For example, in a color television receiver constructed so as to operate in response to the presently standardized color television signals, the value of $\phi$ may be 5 degrees expressed as radians. The constant $A_1$ will also be known. Whereas the value of $A_c$ may be somewhat affected by the design of the circuit components used in the filter of this invention, it will generally be found that the characteristics of the crystal itself are of far greater significance. At present, the best practical crystal that will yield the proper value of $A_c$ in a color television receiver is one that has been contoured. In order to be on the safe side, and to avoid the necessity of testing each crystal, it is preferable to assume the worst possible condition, i.e., if the highest amplitude sideband of the signal applied to the crystal filter occurs at the same frequency as the highest response of the crystal. The necessary calculation can be made by one skilled in the art. The minimum amount of contouring required to meet these conditions can be determined on a trial and error basis, but once determined all of the crystals contoured by this minimum amount will function properly in the crystal filter. In general, it will be found that satisfactory results are obtained if the contouring, or whatever other method may be employed, is such as to reduce all spurious responses of the crystal to a negligible amplitude for a frequency region within which the sidebands of the bursts have any appreciable amplitude. In a color television receiver, for example, wherein the bursts occur at line frequency rate of 15,750 a second and wherein the carrier wave frequency is approximately 3.58 megacycles, crystals having their first significant response at a frequency that is 250 kilocycles above the carrier frequency have been successful.

Although this invention may be used in a variety of applications, crystals having the following specifications have proven highly satisfactory when the crystal filter is used to extract a reference wave from a series of bursts transmitted in accordance with present color television standards. The flat central areas of the crystal range from 1/16 to 3/32 inches. The thickness of the crystal between these central planes is about 7 mills and the contouring or bevelling is such that the thickness of the edge of the crystal is not in excess of 10 mills. The diameter of the crystal is between 3/8 of an inch and 1/2 inch. If the edges are less than 4 mills, the crystal is likely to fracture in use. If the edge thickness is in excess of 6 mills, there is a detrimental increase in the effect of the crystal holder.

While I have illustrated a particular embodiment of my invention, it will of course be understood that I do not wish to be limited thereto, since various modifications in the circuit arrangement and in the instrumentalities may be made, and I contemplate by the appended claims to cover any such modifications as fall within the true spirit and scope of the invention.

What I claim as new and desire to secure by Letters Patent of the United States is:

1. A crystal filter comprising, in combination, a crystal, a driving circuit connected between one side of said crystal and a point of fixed potential, a series resonant circuit comprising an inductor and a capacitor connected in the order named, means for coupling said series resonant circuit to the other side of said crystal and to said point of fixed reference potential, an electron discharge device having at least two electrodes, a biasing circuit connected between one of said electrodes and said point of fixed potential, means connected between the junction of said inductor and capacitor and another of the electrodes of said electron discharge device for applying the output of said series resonant circuit to the last named electrode of said electron discharge device, and a resistor connected across said series resonant circuit for controlling the electron flow in said electron discharge device such that the resistance between said electrodes decreases as the amplitude of the output signal of said series resonant circuit increases, thereby increasing the resistance effectively in series with the crystal which decreases the Q of the filter as a result of an increase in amplitude of the output signal.

2. The structure set forth in claim 1 wherein said means for coupling said series resonant circuit to the other side of said crystal comprises a resistor.

References Cited in the file of this patent

UNITED STATES PATENTS

| | | |
|---|---|---|
| 2,262,707 | Farrington | Nov. 11, 1941 |
| 2,278,801 | Rust et al. | Apr. 7, 1942 |
| 2,323,598 | Hathaway | July 6, 1943 |
| 2,575,363 | Simons | Nov. 20, 1951 |
| 2,742,615 | Presig | Apr. 17, 1956 |

OTHER REFERENCES

Television (Zworykin and Morton), published by John Wiley & Sons, Inc. (New York), 1954 (page 892 relied on).

"Introduction to Color TV," Kaufman and Thomas, 1954, p. 142 (schematic diagram).